US011193446B2

(12) United States Patent
Xue et al.

(10) Patent No.: US 11,193,446 B2
(45) Date of Patent: Dec. 7, 2021

(54) NEEDLE-SHAPED CYLINDER LINER AND PREPARATION METHOD THEREFOR, AND COATING LIQUID FOR PREPARING NEEDLE-SHAPED CYLINDER LINER

(71) Applicant: ZYNP CORPORATION, Henan (CN)

(72) Inventors: Delong Xue, Henan (CN); Zhijun Liu, Henan (CN); Zengjun Dang, Henan (CN); Yong Wang, Henan (CN); Qifei Hou, Henan (CN)

(73) Assignee: ZYNP CORPORATION, Henan (CN)

( * ) Notice: Subject to any disclaimer, the term of this patent is extended or adjusted under 35 U.S.C. 154(b) by 330 days.

(21) Appl. No.: 16/322,118

(22) PCT Filed: Dec. 28, 2016

(86) PCT No.: PCT/CN2016/112634
§ 371 (c)(1),
(2) Date: Jan. 31, 2019

(87) PCT Pub. No.: WO2018/028125
PCT Pub. Date: Feb. 15, 2018

(65) Prior Publication Data
US 2019/0176219 A1 Jun. 13, 2019

(30) Foreign Application Priority Data

Aug. 10, 2016 (CN) .......................... 201610651175.8
Aug. 10, 2016 (CN) .......................... 201610653986.1

(51) Int. Cl.
*B32B 1/08* (2006.01)
*F02F 1/00* (2006.01)
(Continued)

(52) U.S. Cl.
CPC ................ *F02F 1/004* (2013.01); *B22C 3/00* (2013.01); *B22D 13/02* (2013.01); *B32B 1/02* (2013.01);
(Continued)

(58) Field of Classification Search
CPC .... F02F 1/00; F02F 1/004; B32B 1/02; B32B 1/08; C09D 1/00; C09D 1/02; C09D 1/04;
(Continued)

(56) References Cited

U.S. PATENT DOCUMENTS

2005/0161187 A1 7/2005 Kodama et al.
2006/0159909 A1 7/2006 Aslan et al.
(Continued)

FOREIGN PATENT DOCUMENTS

CN 2576980 Y 10/2003
CN 1652888 A 8/2005
(Continued)

OTHER PUBLICATIONS

International Search Report for PCT/CN2016/112634 dated May 8, 2017, ISA/CN.
(Continued)

*Primary Examiner* — Walter Aughenbaugh
(74) *Attorney, Agent, or Firm* — Yue (Robert) Xu; Apex Attorneys at Law, LLP (57) ABSTRACT

A coating liquid for preparing a needle-shaped cylinder liner, comprising the following components: 0.05-0.4 parts of an anionic surfactant; 0.05-0.5 parts of tannic acid; 0.15-0.7 parts of caustic soda; 22-38 parts of diatomite; 3-10 parts of montmorillonite; and 62-75 parts of water. A method for preparing a needle-shaped cylinder liner comprises spraying a coating liquid for preparing the needle-shaped cylinder liner onto the inner wall of a hollow cylindrical
(Continued)

mould, and drying the coating liquid to obtain a mould with a coating attached to the surface of the inner wall; adding an inoculated iron liquid into the rotary mould, and cooling and demoulding to obtain a cylinder liner blank; and subjecting the blank to outer surface cleaning and forming machining to obtain the needle-shaped cylinder liner.

23 Claims, 3 Drawing Sheets

(51) Int. Cl.
   *C09D 9/04* (2006.01)
   *C09D 7/00* (2018.01)
   *B32B 1/02* (2006.01)
   *B22C 3/00* (2006.01)
   *B22D 13/02* (2006.01)
   *C04B 35/14* (2006.01)
   *C04B 35/622* (2006.01)
   *C04B 35/626* (2006.01)
   *C22C 37/06* (2006.01)
   *C22C 37/10* (2006.01)

(52) U.S. Cl.
   CPC ............ *B32B 1/08* (2013.01); *C04B 35/14* (2013.01); *C04B 35/6264* (2013.01); *C04B 35/62222* (2013.01); *C09D 7/00* (2013.01); *C09D 9/04* (2013.01); *C22C 37/06* (2013.01); *C22C 37/10* (2013.01); *C04B 2235/349* (2013.01); *C04B 2235/3418* (2013.01); *C04B 2235/606* (2013.01); *C04B 2235/9676* (2013.01)

(58) Field of Classification Search
   CPC ...... C09D 1/10; C09D 1/12; C04B 2235/349; C04B 2235/606
   See application file for complete search history.

(56) References Cited

U.S. PATENT DOCUMENTS

| | | | |
|---|---|---|---|
| 2007/0240652 A1 | 10/2007 | Michioka et al. | |
| 2009/0050288 A1 | 2/2009 | Laudenklos | |
| 2012/0048106 A1 | 3/2012 | Horigome et al. | |
| 2012/0087824 A1 | 4/2012 | Mol De Oliveira et al. | |
| 2015/0122118 A1 | 5/2015 | He et al. | |

FOREIGN PATENT DOCUMENTS

| | | | | |
|---|---|---|---|---|
| CN | 1905969 A | | 1/2007 | |
| CN | 100406158 C | | 7/2008 | |
| CN | 101381838 A | | 3/2009 | |
| CN | 101497105 A | | 8/2009 | |
| CN | 101500729 A | | 8/2009 | |
| CN | 100572462 C | | 12/2009 | |
| CN | 201606158 U | | 10/2010 | |
| CN | 102317480 A | | 1/2012 | |
| CN | 103042169 A | * | 4/2013 | ............ B22C 3/00 |
| CN | 104131216 A | | 11/2014 | |
| CN | 104313454 A | | 1/2015 | |
| CN | 104588572 A | | 5/2015 | |
| CN | 104595050 A | * | 5/2015 | ............ B22C 3/00 |
| CN | 105234366 A | | 1/2016 | |
| CN | 105344930 A | | 2/2016 | |
| CN | 105344931 A | | 2/2016 | |
| CN | 105369115 A | | 3/2016 | |
| CN | 105441831 A | | 3/2016 | |
| CN | 106180626 A | | 12/2016 | |
| EP | 2422902 A2 | | 2/2012 | |
| JP | 2002178122 A | | 6/2002 | |
| JP | 2003164956 A | | 6/2003 | |
| JP | 2004257422 A | | 9/2004 | |
| JP | 2004339577 A | | 12/2004 | |
| JP | 4481481 B2 | | 6/2010 | |
| WO | 2005065867 A1 | | 7/2005 | |

OTHER PUBLICATIONS

CNIPA First Office Action corresponding to Application No. 201610651175.8; dated Dec. 4, 2017.
CNIPA First Office Action corresponding to Application No. 201610653986.1; dated Oct. 30, 2017.
CNIPA Second Office Action corresponding to Application No. 201610653986.1; dated Jul. 3, 2018.
Search Report of corresponding European Application No. 17169659.4; dated Dec. 22, 2017.

* cited by examiner

NEEDLE-SHAPED CYLINDER LINER AND PREPARATION METHOD THEREFOR, AND COATING LIQUID FOR PREPARING NEEDLE-SHAPED CYLINDER LINER

CROSS REFERENCE TO RELATED APPLICATIONS

This application is a US National Phase application based upon PCT Application No. PCT/CN2016/112634 filed Dec. 28, 2016, which claims the priority of Chinese Patent Application No. 201610653986.1 titled with "NEEDLE-SHAPED CYLINDER LINER AND PREPARATION METHOD THEREFOR" filed on Aug. 10, 2016 and Chinese Patent Application No. 201610651175.8 titled with "COATING LIQUID FOR PREPARING NEEDLE-SHAPED CYLINDER LINER" filed on Aug. 10, 2016, and the disclosures of which are hereby incorporated by reference.

FIELD

The present invention belongs to the field of cylinder liners, and in particular relates to a needle-shaped cylinder liner as well as a method and a coating solution for manufacturing the same.

BACKGROUND

The all-aluminum engine has advantages of light weight, good heat dissipation and so on, and has been widely used in the industry. However, the mechanical properties, wear resistance, thermal stability or the like of the all-aluminum engine are inferior to cast iron. For this reason, this problem is solved currently by means of an aluminum cylinder block plus a cast iron inserted sleeve is used to solve in the industry.

A cast iron inserted sleeve applied to the aluminum cylinder block is also referred to as a cylinder liner, among which the needle-shaped cylinder liner has a larger market demand. A needle-shaped cylinder liner is casted directly from molten iron, and its external surface is distributed with needle-like protrusions which can increase the bonding force and thermal conductivity of the cylinder liner and the aluminum cylinder block, thereby improving the heat dissipation efficiency of the engine.

The production of a needle-shaped cylinder liner usually comprises the steps of: firstly formulating a coating solution; then spraying the coating solution into the inner wall of a mold and forming holes in the inner wall of the mold after the coating solution is dried; subsequently pouring the molten iron into the mold where the molten iron is formed into a cylindrical cylinder liner blank in the mold under the action of centrifugal force while protrusions are formed on the external circumferential surface thereof; and finally removing the cylinder liner blank, washing off the coating solution on the surface thereof and molding processing, to obtain a needle-shaped cylinder liner.

In the production process of the needle-shaped cylinder liner, the coating solution is one of the key factors affecting the needle-shaped texture structure on the external surface of the needle-shaped cylinder liner. However, there is a problem in the existing coating solutions that size and distribution of the holes are not uniform after drying, which seriously affects the external surface morphologies of the produced needle-shaped cylinder liner and results in a poor bonding strength and bonding rate between the cylinder liner and the aluminum cylinder block, thus influencing the heat dissipation efficiency of the engine.

SUMMARY

In order to solve the above technical problems, an object of the present invention is to provide a needle-shaped cylinder liner as well as a method and a coating solution for manufacturing the same. By using the coating solution provided according to the present invention, a needle-shaped cylinder liner with protrusions having a moderate size and uniform distribution on the external surface thereof can be produced.

The present invention provides a coating solution for producing a needle-shaped cylinder liner, comprising, in parts by weight the following components:

| | |
|---|---|
| Anionic surfactant | 0.05-0.4; |
| Tannic acid | 0.05-0.5; |
| Caustic soda | 0.15-0.7; |
| Diatomaceous earth | 22-38; |
| Montmorillonite | 3-10; |
| Water | 62-75. |

Preferably, the anionic surfactant comprises one or more selected from the group consisting of sodium dodecyl benzene sulfonate, triethanolamine dodecyl benzene sulfonate, surfactant AS and ammonium dodecyl sulfate.

Preferably, the diatomaceous earth has a permeability of 2-3.

Preferably, the diatomaceous earth has a bulk density of 0.33-0.65 g/cm$^3$.

Preferably, the diatomaceous earth has a particle size of 100-800 mesh.

Preferably, the montmorillonite has a density of 2.0-2.7 g/cm$^3$.

Preferably, the montmorillonite has an expansion ratio of 30-50.

Preferably, the montmorillonite has a particle size of 0.2-1 μm.

Preferably, the coating solution comprises, in parts by weight, the following components:

| | |
|---|---|
| Sodium dodecyl benzene sulfonate | 0.1-0.2; |
| Tannic acid | 0.1-0.3; |
| Caustic soda | 0.2-0.5; |
| Diatomaceous earth | 25-35; |
| Montmorillonite | 5-8; |
| Water | 65-70. |

The present invention provides a method for producing a needle-shaped cylinder liner, comprising the steps of:

a) spraying the coating solution described in the above embodiments into an inner wall of a hollow cylindrical mold and then drying to obtain a mold with a coating attached on a surface of the inner wall thereof;

b) adding inoculated molten iron into the rotating mold with the coating attached on the surface of the inner wall thereof, and then demoulding after cooling to obtain a cylinder liner blank; and c) successively subjecting the cylinder liner blank to external surface cleaning and molding processing to obtain the needle-shaped cylinder liner.

Preferably, step a) comprises: spraying the coating solution into the inner wall of a hollow cylindrical mold in a centrifugal tube casting machine and then drying to obtain a mold with a coating attached on a surface of the inner wall thereof.

Preferably, the coating solution is sprayed under a pressure of 0.3-0.5 MPa.

Preferably the centrifugal tube casting machine has a rotation speed of 1350-1650 r/min.

Preferably, the hollow cylindrical mold has a temperature of 150-300° C.

Preferably, the coating solution has a coating thickness of 0.3-1.2 mm on the inner wall of the mold.

The present invention further provides another method for producing a needle-shaped cylinder liner, comprising the steps of:

A) adding the coating solution described in the above embodiments into a pressure tank of coating; activating a centrifugal tube casting machine equipped with a mold and having a rotation speed set to be 1400-1600 r/min and heating the mold to a temperature of 160-240° C.; then spraying the coating solution into the inner wall of the mold at an ejection pressure of 0.4-0.5 MPa; and finally drying, to obtain the mold with a coating attached on a surface of the inner wall thereof, wherein the coating has a thickness of 0.35-1.2 mm;

B) mixing molten iron with silicon strontium inoculant in a mass ratio of 100:(0.65-0.95) for inoculation treatment, wherein the molten iron comprises 3.31-3.62 wt % of C, 0.04-0.10 wt % of S, 2.07-2.68 wt % of Si, 0.07-0.18 wt % of P, 0.62-0.94 wt % of Mn, 0.27-0.38 wt % of Cr, 0.12-0.48 wt % of Cu and Fe being the balance; then controlling the inoculated molten iron at a temperature of 1480-1550° C. and pouring it into the rotating mold with the coating attached on the surface of the inner wall thereof, and demoulding after cooling to obtain a cylinder liner blank, wherein the cooling is carried out for 76-92 s and the demoulding is performed at a temperature of 680-800° C.; and C) cleaning the external surface of the cylinder liner blank using a centrifugal shot-blasting machine, wherein steel shots used for cleaning have a diameter of 0.15-0.3 mm and an ejection pressure of 8-14 kg during the cleaning, and the cleaning is carried out for 8-16 s, then molding processing the cleaned cylinder liner blank to obtain the needle-shaped cylinder liner.

The present invention further provides a needle-shaped cylinder liner, on the external circumferential surface of which a plurality of protrusions are distributed, wherein a single protrusion has a height of 0.15-1.2 mm, a cross-sectional area of 0.2-0.6 mm$^2$ at ⅗ of average height thereof, and a cross-sectional area of 0.05-7 mm$^2$ at 0.2 mm away from the root portion thereof.

Preferably, a single protrusion has a height of 0.6-1.1 mm.

Preferably, a single protrusion has a cross-sectional area of 0.2-0.7 mm$^2$ at 0.2 mm away from the root portion thereof.

Preferably, the number of the protrusions on the external circumferential surface of the needle-shaped cylinder liner is not less than 30 protrusions/cm$^2$.

Preferably, the number of the protrusions on the external circumferential surface of the needle-shaped cylinder liner is 40-65 protrusions/cm$^2$.

Preferably, the protrusions are needle-shaped, bulb-shaped, mushroom-shaped, cone-shaped or coral-shaped.

As compared to the prior art, the present invention provides a coating solution for producing a needle-shaped cylinder liner and a production method thereof, as well as a needle-shaped cylinder liner and a production method thereof. The coating solution provided according to the present invention comprises, in parts by weight, the following components: 0.05-0.4 parts of an anionic surfactant, 0.05-0.5 parts of tannic acid, 0.15-0.7 parts of caustic soda, 22-38 parts of diatomaceous earth, 3-10 parts of montmorillonite and 62-75 parts of water. In the present invention, a coating solution for manufacturing a needle-shaped cylinder liner and with excellent properties is obtained by optimizing the constituent components and content of each component therein. The coating solution after drying can form pores with a moderate size and uniform distribution on the inner wall surface of a mold, so that the needle-shaped cylinder liner produced in subsequent processes has protrusions with a moderate size and uniform distribution on the external circumferential surface thereof, thereby improving the bonding strength and bonding rate between the needle-shaped cylinder liner and the aluminum cylinder block and improving the heat dissipation efficiency of the engine. The experimental results show that, the needle-shaped cylinder liner produced using the coating solution provided according to the present invention has protrusions uniformly distributed on the external circumferential surface thereof, wherein the protrusions have a height of 0.15-1.2 mm and a single protrusion has a cross-sectional area of 0.05-7 mm$^2$, and the number thereof is not less than 30 per square centimeter. The protrusions uniformly distributed on the external circumferential surface of the needle-shaped cylinder liner are in an irregular shape, such as needle-shaped, bulb-shaped, mushroom-shaped, cone-shaped or coral-shaped, and the like.

DETAILED DESCRIPTION

For further understanding of the invention, preferred embodiments of the invention are described hereinafter in conjunction with the examples, but it is to be understood that these descriptions are merely illustrative of the features and advantages of the invention and are not intended to limit the claims of the invention thereto.

The present invention provides a coating solution, comprising, in parts by weight, the following components:

| | |
|---|---|
| Anionic surfactant | 0.05-0.4; |
| Tannic acid | 0.05-0.5; |
| Caustic soda | 0.15-0.7; |
| Diatomaceous earth | 22-38; |
| Montmorillonite | 3-10; |
| Water | 62-75. |

The coating solution provided according to the present invention comprises an anionic surfactant, tannic acid, caustic soda, diatomaceous earth, montmorillonite and water. The anionic surfactant comprises, but is not limited to, one or more selected from the group consisting of dodecyl benzene sulfonate, triethanolamine dodecyl benzene sulfonate, surfactant AS and ammonium dodecyl sulfate. In the present invention, the anionic surfactant is comprised in the coating solution in an amount of 0.05-0.4 parts by weight. In one embodiment provided according to the present invention, the anionic surfactant is comprised in the coating solution in an amount of 0.1-0.2 parts by weight. In the present invention, the function of the anionic surfactant in the coating solution is to foam for forming small and evenly distributed holes during the drying of the coating solution, thereby ensuring the formation of needle shapes during casting molding process of the blank and facilitating demoulding of the blank.

In the present invention, the tannic acid is comprised in the coating solution in an amount of 0.05-0.5 parts by weight. In one embodiment provided according to the present invention, the tannic acid is comprised in the coating solution in an amount of 0.1-0.3 parts by weight. In the present invention, the function of the tannic acid in the coating solution is to react with caustic soda to generate sodium tannate (a tannin alkali solution), so as to reduce the viscosity of the coating solution.

In the present invention, the caustic soda is comprised in the coating solution in an amount of 0.15-0.7 parts by weight. In one embodiment provided according to the present invention, the caustic soda is comprised in the coating solution in an amount of 0.2-0.5 parts by weight. In the present invention, the function of the caustic soda in the coating solution is to react with tannic acid to generate sodium tannate (a tannin alkali solution), so as to reduce the viscosity of the coating solution.

In the present invention, the diatomaceous earth is a biogenic siliceous sedimentary rock, which mainly consists of the remains of ancient diatoms. In one embodiment provided according to the present invention, the diatomaceous earth has a permeability of 2-3. In another embodiment provided according to the present invention, the diatomaceous earth has a permeability of 2.7. In the present invention, the unit of permeability of the diatomaceous earth is Darcy. In one embodiment provided according to the present invention, the diatomaceous earth has a bulk density of 0.33-0.65 g/cm$^3$. In another embodiment provided according to the present invention, the diatomaceous earth has a bulk density of 0.33-3.5 g/cm$^3$. In one embodiment provided according to the present invention, the diatomaceous earth has a particle size of 100-800 mesh. In another embodiment provided according to the present invention, the diatomaceous earth has a particle size of 140-800 mesh. In the present invention, the diatomaceous earth is comprised in the coating solution in an amount of 22-38 parts by weight. In one embodiment provided according to the present invention, the diatomaceous earth is comprised in the coating solution in an amount of 25-35 parts by weight. In the present invention, the function of the diatomaceous earth in the coating solution is to act as an aggregate therein for playing a role of maintaining the temperature, which not only can protect the mold from being burnt by the molten iron, but also reduce the cooling speed of the molten iron so as to obtain a good metallurgical structure of the cast iron.

In the present invention, the montmorillonite, also known as microcrystalline kaolinite, is an aluminosilicate, and the main component thereof is octahedral montmorillonite particulate. In one embodiment provided according to the present invention, the montmorillonite has a density of 2.0-2.7 g/cm$^3$. In another embodiment provided according to the present invention, the montmorillonite has a density of 2.5-2.6 g/cm$^3$. In one embodiment provided according to the present invention, the montmorillonite has an expansion ratio of 30-50. In one embodiment provided according to the present invention, the montmorillonite has a particle size of 0.2-1 μm. In the present invention, the montmorillonite is comprised in the coating solution in an amount of 3-10 parts by weight. In one embodiment provided according to the present invention, the montmorillonite is comprised in the coating solution in an amount of 5-8 parts by weight.

In the present invention, water is comprised in the coating solution in an amount of 62-75 parts by weight. In one embodiment provided according to the present invention, water is comprised in the coating solution in an amount of 65-70 parts by weight. In the present invention, water in the coating solution acts as a solvent for dissolving other components in the coating solution.

In one embodiment provided according to the present invention, the coating solution comprises 0.1-0.2 parts by weight of sodium dodecyl benzene sulfonate, 0.1-0.3 parts by weight of tannic acid, 0.2-0.5 parts by weight of caustic soda, 25-35 parts by weight of diatomaceous earth, 5-8 parts by weight of montmorillonite and 65-70 parts by weight of water.

The present invention further provides a method for producing the coating solution described in the above embodiments, comprising the step of:

mixing an anionic surfactant, tannic acid, caustic soda, diatomaceous earth, montmorillonite and water to obtain the coating solution.

In the production method of the present invention, the coating solution can be obtained by directly mixing the anionic surfactant, tannic acid, caustic soda, diatomaceous earth, montmorillonite and water homogeneously, wherein their respective amounts have been mentioned above, and will not be described here.

In the present invention, a coating solution with excellent properties for producing a needle-shaped cylinder liner is obtained by optimizing the constituent components and content of each component therein. The coating solution after drying can form pores with a moderate size and uniform distribution on the inner wall surface of a mold, so that the needle-shaped cylinder liner produced in subsequent processes have protrusions with a moderate size and uniform distribution on the external circumferential surface thereof, thereby improving the bonding strength and bonding rate between the needle-shaped cylinder liner and the aluminum cylinder block and improving the heat dissipation efficiency of the engine. The experimental results show that, the needle-shaped cylinder liner produced using the coating solution provided according to the present invention has protrusions uniformly distributed on the external circumferential surface thereof, wherein the protrusions have a height of 0.15-1.2 mm, a single protrusion has a cross-sectional area of 0.05-7 mm$^2$, and the number of protrusions is not less than 30 per square centimeter. The protrusions uniformly distributed on the external circumferential surface of the needle-shaped cylinder liner are in an irregular shape, such as needle-shaped, bulb-shaped, mushroom-shaped, cone-shaped or coral-shaped, and the like.

The present invention provides a method for producing a needle-shaped cylinder liner, comprising steps of:

a) spraying the coating solution described in the above embodiments into an inner wall of a hollow cylindrical mold, and then drying to obtain a mold with a coating attached on the surface of the inner wall thereof;

b) adding inoculated molten iron into the rotating mold with the coating attached on the surface of the inner wall thereof, and then demoulding after cooling to obtain a cylinder liner blank; and c) successively subjecting the cylinder liner blank to external surface cleaning and molding processing to obtain the needle-shaped cylinder liner.

In the production method of the present invention, the coating solution is firstly sprayed into the inner wall of a hollow cylindrical mold, which process comprises in particular: spraying the coating solution into the inner wall of the hollow cylindrical mold in a centrifugal tube casting machine and then drying to obtain the mold with a coating attached on the surface of the inner wall thereof, wherein the coating solution is preferably sprayed under a pressure of 0.3-0.5 MPa; the centrifugal tube casting machine preferably has a rotation speed of 1350-1650 r/min, and more preferably 1400-1600 r/min; and the hollow cylindrical mold preferably has a temperature of 150-300° C., and more preferably 160-240° C. Following the completion of spraying, the coating solution is dried, and a coating with pores is formed during drying of the coating solution. Upon the completion of drying, the mold with a coating attached on the surface of the inner wall thereof is obtained. The coating preferably has a thickness of 0.3-1.2 mm and more preferably 0.35-0.78 mm. There are pores distributed on the coating.

After the mold with a coating attached on the surface of the inner wall thereof is obtained, the inoculated molten iron is added into the rotating mold. The molten iron comprises C, S, Si, P, Mn, Cr, Cu and Fe. In the present invention, the molten iron comprises: preferably 3.2-3.7 wt %, more preferably 3.31-3.62 wt %, and most preferably 3.31 wt %, 3.53 wt % or 3.62 wt % of C; preferably <0.15 wt %, more preferably 0.04-0.1 wt %, and most preferably 0.04 wt %, 0.08 wt % or 0.1 wt % of S; preferably 2.0-2.8 wt %, more preferably 2.07-2.68 wt %, and most preferably 2.07 wt %, 2.37 wt % or 2.68 wt % of Si; preferably 0.05-0.2 wt %, more preferably 0.07-0.18 wt %, and most preferably 0.07 wt %, 0.12 wt % or 0.18 wt % of P; preferably 0.5-1.0 wt %, more preferably 0.62-0.94 wt % and most preferably 0.62 wt %, 0.71 wt % or 0.94 wt % of Mn; preferably 0.1-0.4 wt %, more preferably 0.12-0.38 wt %, and most preferably 0.12 wt %, 0.27 wt % or 0.38 wt % of Cr; preferably 0.1-0.5 wt %, more preferably 0.12-0.48 wt %, and most preferably 0.12 wt %, 0.31 wt % or 0.48 wt % of Cu; and preferably Fe being the balance. In the present invention, an inoculant used in the inoculation of the molten iron is preferably silicon based inoculant, and is preferably used in an amount of 0.6-1.0 wt % and more preferably 0.65-0.95 wt % of the mass of the molten iron. The molten iron added into the mold preferably has an initial temperature of 1480-1550° C.; the mold preferably has an initial temperature of 150-300° C. and more preferably 160-240° C. The mold preferably has a rotation speed of 1350-1650 r/min, and more preferably 1400-1600 r/min. After addition to the rotating mold, the inoculated molten iron is subjected to cooling and demoulding to obtain a cylinder liner blank, wherein the cooling is preferably carried out for 60-100 s and more preferably 76-92 s, and the demoulding is preferably performed at a temperature of 680-800° C. In the present invention, the coating in the inner wall of the mold is adhered on a surface of the demoulded cylinder liner blank.

After the cylinder liner blank is obtained, it is successively subjected to external surface cleaning and molding processing, wherein the external surface cleaning is preferably performed using a centrifugal shot-blasting machine. In one embodiment of present invention using a centrifugal shot-blasting machine for external surface cleaning, materials used for the cleaning are preferably steel shots with a diameter of <0.3 mm and more preferably 0.15-0.3 mm and the steel shots preferably have an ejection pressure of 3-15 kg and more preferably 8-14 kg. The surface cleaning is preferably carried out for 5-20 s and more preferably 8-16 s. The means for molding processing is not particularly limited in the present invention, and those well known to those skilled in the art can be employed to process the surface-cleaned blank to a predetermined size. Following the completion of molding processing, a needle-shape cylinder liner article is obtained.

In one embodiment provided according to the present invention, the needle-shape cylinder liner is in particular produced by:

A) adding the coating solution into a pressure tank of coating; activating a centrifugal tube casting machine equipped with a mold and having a rotation speed set to be 1400-1600 r/min and heating the mold to a temperature of 160-240° C.; then spraying the coating solution into the inner wall of the mold at an ejection pressure of 0.4-0.5 MPa; and finally drying, to obtain the mold with a coating attached on a surface of the inner wall thereof, wherein the coating has a thickness of 0.35-1.2 mm;

B) mixing molten iron with silicon strontium inoculant in a mass ratio of 100:(0.65-0.95) for inoculation treatment, wherein the molten iron comprises 3.31-3.62 wt % of C, 0.04-0.10 wt % of S, 2.07-2.68 wt % of Si, 0.07-0.18 wt % of P, 0.62-0.94 wt % of Mn, 0.27-0.38 wt % of Cr, 0.12-0.48 wt % of Cu and Fe being the balance; then controlling the inoculated molten iron at a temperature of 1480-1550° C. and pouring it into the rotating mold with the coating attached on the surface of the inner wall thereof, and demoulding after cooling to obtain a cylinder liner blank, wherein the cooling is carried out for 76-92 s and the demoulding is performed at a temperature of 680-800° C.; and C) cleaning the external surface of the cylinder liner blank using a centrifugal shot-blasting machine, wherein steel shots used for cleaning have a diameter of 0.15-0.3 mm and an ejection pressure of 8-14 kg during the cleaning, and the cleaning is carried out for 8-16 s; then molding processing the cleaned cylinder liner blank to obtain the needle-shaped cylinder liner.

In the present invention, a coating solution with excellent properties for producing a needle-shaped cylinder liner is obtained by optimizing the constituent components and content of each component therein. The coating solution after drying can form pores with a moderate size and uniform distribution on the inner wall surface of a mold, so that the needle-shaped cylinder liner produced in subsequent processes have protrusions with a moderate size and uniform distribution on the external circumferential surface thereof, thereby improving the bonding strength and bonding rate between the needle-shaped cylinder liner and the aluminum cylinder block and improving the heat dissipation efficiency of the engine. The experimental results show that, the needle-shaped cylinder liner produced using the method provided according to the present invention has protrusions uniformly distributed on the external circumferential surface thereof, wherein the protrusions have a height of 0.15-1.2 mm, a single protrusion has a cross-sectional area of 0.05-7 mm$^2$, and the number of protrusions is not less than 30 per square centimeter. The protrusions uniformly distributed on the external circumferential surface of the needle-shaped cylinder liner are in an irregular shape, such as needle-shaped, bulb-shaped, mushroom-shaped, cone-shaped or coral-shaped, and the like.

The present invention further provides a needle-shaped cylinder liner, on the external circumferential surface of which a plurality of protrusions are distributed, wherein a single protrusion has a height of 0.15-1.2 mm, preferably 0.6-1.1 mm and more preferably 0.67-1.05 mm: a cross-sectional area of 0.2-0.6 mm$^2$ and preferably 0.25-0.58 mm$^2$ at ⅗ of average height thereof, and a cross-sectional area of 0.05-7 mm$^2$, preferably 0.1-1 mm$^2$, more preferably 0.2-0.7 mm$^2$ and most preferably 0.21-0.62 mm$^2$ at 0.2 mm away from the root portion thereof. The number of the protrusions on the external circumferential surface of the needle-shaped cylinder liner is preferably not less than 30/cm$^2$, and more preferably 40-65/cm$^2$. The protrusions are preferably needle-shaped, bulb-shaped, mushroom-shaped, cone-shaped or coral-shaped.

For the sake of clarity, the following Examples are described in detail.

Example 1

1) Formulation Design:

| Composition | Manufacturers or physico-chemical indices | Content (parts by weight) |
| --- | --- | --- |
| Sodium Dodecyl Benzene Sulfonate | Shenzhen Taida Chemical Co., Ltd | 0.15 |
| Tannic Acid | Sijie Chemical | 0.2 |
| Caustic Soda | Sijie Chemical | 0.4 |
| Diatomaceous Earth | Permeability: 2.7 Bulk density: 0.33-0.35 g/cm$^3$ Particle size: 140-800 mesh | 30 |
| Montmorillonite | Density: 2.5 g/cm$^3$ Expansion ratio: 30-50 Particle size: 0.2-1 μm | 7 |
| Water | — | 68 |

2) Production of a Coating Solution

Into a stirrer vessel, an anionic surfactant, tannic acid, caustic soda, diatomaceous earth, montmorillonite and water were added and stirred homogeneously to obtain a coating solution.

3) Observation on the Apparent Morphology of the Coating Solution after Drying

Figure 1:
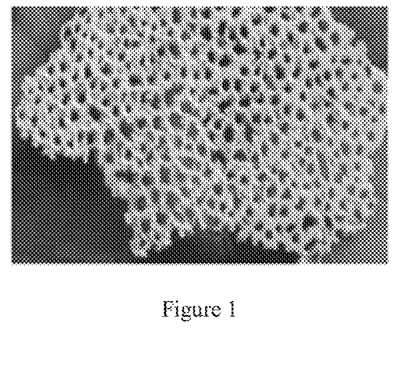
FIG. 1 is a digital photograph of the dried coating peeled off from the inner wall of the mold provided in Example 1 of the present invention.

The coating solution above was added into a pressure tank of coating and the pressure thereof was adjusted to 0.4 Mpa. A centrifugal tube casting machine was activated with a rotation speed set to be 1400 r/min, and the mold was heated to a temperature of 160° C. Then, the coating solution was sprayed into the inner wall of the mold in a thickness of 0.5 mm and a coating with a porous structure was formed in the inner wall of the mold after drying. The dried coating was peeled off from the inner wall of the mold and a digital photograph was taken, as shown in FIG. 1. FIG. 1 is a digital photograph of a dried coating peeled off from the inner wall of the mold provided in Example 1 of the present invention. As can be seen from FIG. 1, the coating solution provided according to the present invention can form pores with a moderate size and uniform distribution on the inner wall surface of the mold, and thus be used for the production of a needle-shaped cylinder liner.

4) Production of a Cylinder Liner Finished Product 3-1) Smelting of cast iron material: the pig iron and steel scrap were added into a coreless medium frequency induction furnace and melted. After melting, ferrosilicon, phosphorus iron, ferromanganese, ferrochrome, electrolytic copper, ferrous sulfide and other alloy materials were added based on the analysis results from a spectrometer. Following a homogeneous melting, the composition was confirmed through a spectrometer and the molten iron with a qualified composition was obtained. The original material was slightly adjusted to produce respective components having the following mass percent: 3.62 wt % of carbon, 0.04 wt % of sulfur, 2.07 wt % of silicon, 0.18 wt % of phosphorus, 0.62 wt % of manganese, 0.12 wt % of chromium, 0.48 wt % of copper, and iron being the balance.

3-2) Centrifugal casting: the coating solution formulated above was added into a pressure tank of coating and the pressure thereof was adjusted to 0.5 Mpa. A centrifugal tube casting machine was activated with a rotation speed set to be 1400 r/min, and the mold was heated to a temperature of 160° C. Then, the coating solution was sprayed into the inner wall of the mold in a thickness of 0.35 mm and pores with a random distribution of shapes were formed after drying The qualified molten iron was brought to a temperature of 1520° C. and then transferred into a casting ladle, and meanwhile silicon strontium inoculant was added in a ratio of 0.65 wt % based on the mass of the molten iron for inoculation treatment. Subsequently, the inoculated molten iron was controlled at a temperature of 1480° C. and poured into the mold cavity where by cooling the mold, the molten iron was molded into a cylindrical cylinder liner blank under the action of centrifugal force, on the external circumferential surface of which protrusions with a uniform distribution were formed meanwhile. The cooling was performed for a total of 92 s, and the blank was demoulded at a temperature of 700° C.

3-3) Cleaning of the coating: the coating on the external circumferential surface of the cylinder liner blank was cleaned within a period of 12 s under an ejection pressure of 10 kg with steel shots of 0.15-0.3 mm in diameter by using a centrifugal shot-blasting machine, and molding processing was performed to obtain the needle-shaped cylinder liner finished product.

Example 2

1) Formulation Design:

| Composition | Manufacturers or physico-chemical indices | Content (parts by weight) |
| --- | --- | --- |
| Sodium Dodecyl Benzene Sulfonate | Shenzhen Taida Chemical Co., Ltd | 0.1 |
| Tannic Acid | Sijie Chemical | 0.3 |
| Caustic Soda | Sijie Chemical | 0.2 |
| Diatomaceous Earth | Permeability: 2.7 Bulk density: 0.33-0.35 g/cm$^3$ Particle size: 140-800 mesh | 35 |
| Montmorillonite | Density: 2.5 g/cm$^3$ Expansion ratio: 30-50 Particle size: 0.2-1 μm | 5 |
| Water | — | 70 |

2) Production of a Coating Solution

Into a stirrer vessel, an anionic surfactant, tannic acid, caustic soda, diatomaceous earth, montmorillonite and water were added and stirred homogeneously to obtain the coating solution.

3) Production of a Cylinder Liner Finished Product 3-1) Smelting of cast iron material: the pig iron and steel scrap were added into a coreless medium frequency induction furnace and melted. After melting, ferrosilicon, phosphorus iron, ferromanganese, ferrochrome, electrolytic copper, ferrous sulfide and other alloy materials were added based on the analysis results from a spectrometer. Following a homogeneous melting, the composition was confirmed through a spectrometer and the molten iron with a qualified composition was obtained. The original material was slightly adjusted to produce respective components having the following mass percent: 3.31 wt % of carbon, 0.08 wt % of sulfur, 2.68 wt % of silicon, 0.07 wt % of phosphorus, 0.94 wt % of manganese, 0.38 wt % of chromium, 0.12 wt % of copper, and the balance of iron.

3-2) Centrifugal casting: the coating solution formulated above was added into a pressure tank of coating and the pressure thereof was adjusted to 0.5 Mpa. A centrifugal tube casting machine was activated with a rotation speed set to be 1600 r/min, and the mold was heated to a temperature of 240° C. Then, the coating solution was sprayed into the inner wall of the mold in a thickness of 1.2 mm and pores with a uniform distribution were formed after drying. The qualified molten iron was brought to a temperature of 1540° C. and then transferred into a casting ladle, and meanwhile silicon strontium inoculant was added in a ratio of 0.95 wt % based on the mass of the molten iron for inoculation treatment. Subsequently, the inoculated molten iron was controlled at a temperature of 1500° C. and poured into the mold cavity where by cooling the mold, the molten iron was molded into a cylindrical cylinder liner blank under the action of centrifugal force, on the external circumferential surface of which protrusions with a uniform distribution were formed meanwhile. The cooling was performed for a total of 76 s, and the blank was demoulded at a temperature of 800° C.

3-3) Cleaning of the coating: the coating on the external circumferential surface of the cylinder liner blank was cleaned within a period of 16 s under an ejection pressure of 8 kg with steel shots of 0.15-0.3 mm in diameter by using a centrifugal shot-blasting machine, and molding processing was performed to obtain a needle-shaped cylinder liner finished product.

Example 3

Production of a Coating Solution

1) Formulation Design:

| Composition | Manufacturers or physico-chemical indices | Content (parts by weight) |
| --- | --- | --- |
| Sodium Dodecyl Benzene Sulfonate | Shenzhen Taida Chemical Co., Ltd | 0.2 |
| Tannic Acid | Sijie Chemical | 0.1 |
| Caustic Soda | Sijie Chemical | 0.5 |
| Diatomaceous Earth | Permeability: 2.7 Bulk density: 0.33-0.35 g/cm$^3$ Particle size: 140-800 mesh | 25 |
| Montmorillonite | Density: 2.5 g/cm$^3$ Expansion ratio: 30-50 Particle size: 0.2-1 μm | 8 |
| Water | — | 65 |

2) Production of a Coating Solution

Into a stirrer vessel, an anionic surfactant, tannic acid, caustic soda, diatomaceous earth, montmorillonite and water were added and stirred homogeneously to obtain the coating solution.

3) Production of a Cylinder Liner Finished Product 3-1) Smelting of cast iron material: the pig iron and steel scrap were added into a coreless medium frequency induction furnace and melted. After melting, ferrosilicon, phosphorus iron, ferromanganese, ferrochrome, electrolytic copper, ferrous sulfide and other alloy materials were added based on the analysis results from a spectrometer. Following a homogeneous melting, the composition was confirmed through a spectrometer and the molten iron with a qualified composition was obtained. The original material was slightly adjusted to produce respective components having the following mass percent: 3.53 wt % of carbon, 0.10 wt % of sulfur, 2.37 wt % of silicon, 0.12 wt % of phosphorus, 0.71 wt % of manganese, 0.27 wt % of chromium, 0.31 wt % of copper, and iron being the balance.

3-2) Centrifugal casting: the coating solution formulated above was added into a pressure tank of coating and the pressure thereof was adjusted to 0.4 Mpa. A centrifugal tube casting machine was activated with a rotation speed set to be 1550 r/min, and the mold was heated to a temperature of 220° C. Then, the coating solution was sprayed into the inner wall of the mold in a thickness of 0.78 mm and pores with a uniform distribution were formed after drying. The qualified molten iron was brought to a temperature of 1590° C. and then transferred into a casting ladle, and meanwhile silicon strontium inoculant was added in a ratio of 0.78 wt % based on the mass of the molten iron for inoculation treatment. Subsequently, the inoculated molten iron was controlled at a temperature of 1550° C. and poured into the mold cavity where by cooling the mold, the molten iron was molded into a cylindrical cylinder liner blank under the action of centrifugal force, on the external circumferential surface of which protrusions with a uniform distribution were formed meanwhile. The cooling was performed for a total of 84 s, and the blank was demoulded at a temperature of 680° C.

3-3) Cleaning of the coating: the coating on the external circumferential surface of the cylinder liner blank was cleaned within a period of 8 s under an ejection pressure of 14 kg with steel shots of 0.15-0.3 mm in diameter by using a centrifugal shot-blasting machine, and molding processing was performed to obtain a needle-shaped cylinder liner finished product.

Example 4

Observations on the needle shape of the surface of the needle-shaped cylinder liner article The external surfaces of the needle-shaped cylinder liners produced in Examples 1-3 were observed, and the results are provided below.

Figure 2:
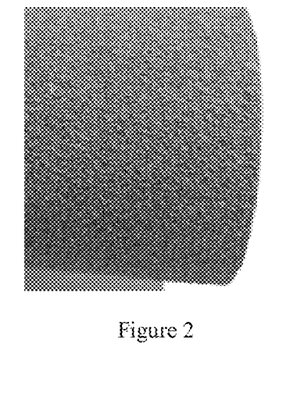
FIG. 2 is a digital photograph of the needle-shaped cylinder liner provided in Example 4 of the present invention, which is produced from the coating solution of Example 1.
Figure 3:
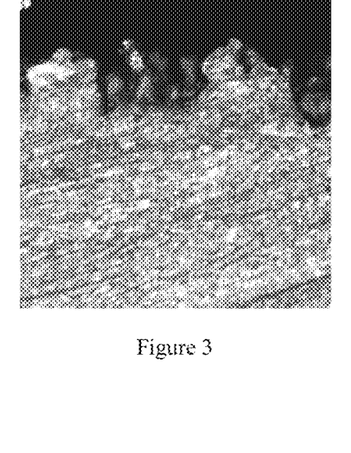
FIG. 3 is a digital photograph of needle-shaped parts of the needle-shaped cylinder liner provided in Example 4 of the present invention and taken along the axial direction of the cylinder liner, which is produced from the coating solution of Example 1.
Figure 4:
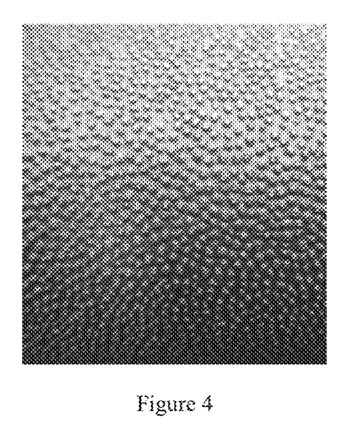
FIG. 4 is a digital photograph of the needle-shaped cylinder liner provided in Example 4 of the present invention, which is produced from the coating solution of Example 2.
Figure 5:
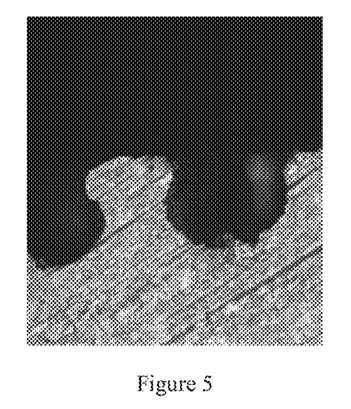
FIG. 5 is a digital photograph of needle-shaped parts of the needle-shaped cylinder liner provided in Example 4 of the present invention and taken along the axial direction of the cylinder liner, which is produced from the coating solution of Example 2.

1) The observations on the needle-shaped cylinder liner produced from the coating solution of Example 1 are shown in FIGS. 2 and 3. FIG. 2 is a digital photograph of the needle-shaped cylinder liner provided in Example 4 of the present invention, which is produced from the coating solution of Example 1. FIG. 3 is a digital photograph of needle-shaped parts of the needle-shaped cylinder liner provided in Example 4 of the present invention and taken along the axial direction of the cylinder liner, which is produced from the coating solution of Example 1. According to FIGS. 2 and 3, the following quantitative results can be obtained: a plurality of protrusions are evenly distributed on the external surface of the needle-shaped cylinder liner, which have a height of 0.25 mm:

2) The observations on the needle-shaped cylinder liner produced from the coating solution of Example 2 are shown in FIGS. 4 and 5. FIG. 4 is a digital photograph of the needle-shaped cylinder liner provided in Example 4 of the present invention, which is produced from the coating solution of Example 2. FIG. 5 is a digital photograph of needle-shaped parts of the needle-shaped cylinder liner provided in Example 4 of the present invention and taken along the axial direction of the cylinder liner, which is produced from the coating solution of Example 2. According to FIGS. 4 and 5, the following quantitative results can be obtained: a plurality of protrusions are evenly distributed on the external surface of the needle-shaped cylinder liner, more than 80% of which are needle-shaped, bulb-shaped, mushroom-shaped, cone-shaped or coral-shaped. The protrusions on the external surface of the needle-shaped cylinder liner have an average height of 1.05 mm, and the number of protrusions is 41 per square centimeter. A single protrusion has a cross-sectional area of 0.79 mm² at the bottom thereof, a cross-sectional area of 0.58 mm² at ⅗ of average height thereof, and a cross-sectional area of 0.62 mm² at 0.2 mm away from the root portion thereof.

Figure 6:
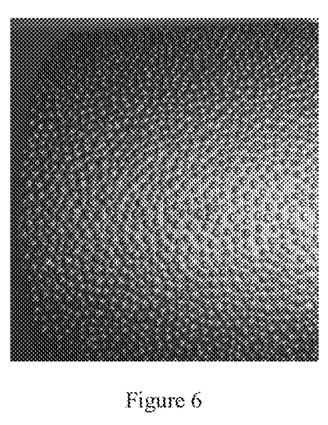
FIG. 6 is a digital photograph of the needle-shaped cylinder liner provided in Example 4 of the present invention, which is produced from the coating solution of Example 3.
Figure 7:
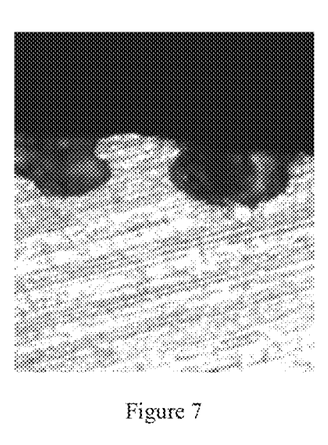
FIG. 7 is a digital photograph of needle-shaped parts of the needle-shaped cylinder liner provided in Example 4 of the present invention and taken along the axial direction of the cylinder liner, which is produced from the coating solution of Example 3.

3) The observations on the needle-shaped cylinder liner produced from the coating solution of Example 3 are shown in FIGS. 6 and 7. FIG. 6 is a digital photograph of the needle-shaped cylinder liner provided in Example 4 of the present invention, which is produced from the coating solution of Example 3. FIG. 7 is a digital photograph of needle-shaped parts of the needle-shaped cylinder liner provided in Example 4 of the present invention and taken along the axial direction of the cylinder liner, which is produced from the coating solution of Example 3. According to FIGS. 6 and 7, the following quantitative results can be obtained: a plurality of protrusions are evenly distributed on the external surface of the needle-shaped cylinder liner, more than 80% of which are needle-shaped, bulb-shaped, mushroom-shaped, cone-shaped or coral-shaped. The protrusions on the external surface of the needle-shaped cylinder liner have an average height of 0.67 mm, and the number of the protrusions is 62 per square centimeter. A single protrusion has a cross-sectional area of 0.356 mm² at the bottom thereof, a cross-sectional area of 0.25 mm² at ⅗ of average height thereof, and a cross-sectional area of 0.21 mm² at 0.2 mm away from the root portion thereof.

While the foregoing is only preferred embodiments of the present invention, it should be noted that modifications and improvements may be made thereto by those skilled in the art without departing from the principles of the present invention, which shall also be considered to be within the protection scope of the present invention.

What is claimed is:

1. A coating solution for producing a needle-shaped cylinder liner, comprising, in parts by weight, the following components:

| | |
|---|---|
| Anionic surfactant | 0.05-0.4; |
| Tannic acid | 0.05-0.5; |
| Caustic soda | 0.15-0.7; |
| Diatomaceous earth | 22-38; |
| Montmorillonite | 3-10; |
| Water | 62-75. |

2. The coating solution according to claim 1, wherein the anionic surfactant comprises one or more selected from the group consisting of sodium dodecyl benzene sulfonate, triethanolamine dodecyl benzene sulfonate, and ammonium dodecyl sulfate.

3. The coating solution according to claim 1, wherein the diatomaceous earth has a permeability of 2 to 3 Darcy.

4. The coating solution according to claim 1, wherein the diatomaceous earth has a bulk density of 0.33 to 0.65 g/cm³.

5. The coating solution according to claim 1, wherein the diatomaceous earth has a particle size of 100 to 800 mesh.

6. The coating solution according to claim 1, wherein the montmorillonite has a density of 2.0 to 2.7 g/cm³.

7. The coating solution according to claim 1, wherein the montmorillonite has an expansion ratio of 30 to 50.

8. The coating solution according to claim 1, wherein the montmorillonite has a particle size of 0.2 to 1 μm.

9. The coating solution according to claim 1, comprising, in parts by weight, the following components:

| | |
|---|---|
| Sodium dodecyl benzene sulfonate | 0.1-0.2; |
| Tannic acid | 0.1-0.3; |
| Caustic soda | 0.2-0.5; |
| Diatomaceous earth | 25-35; |
| Montmorillonite | 5-8; |
| Water | 65-70. |

10. A method for producing a needle-shaped cylinder liner, comprising the steps of:
  a) spraying the coating solution according to claim 1 into an inner wall of a hollow cylindrical mold and then drying to obtain the mold with a coating attached on a surface of the inner wall thereof;
  b) adding inoculated molten iron into the rotating mold with the coating attached on the surface of the inner wall thereof, and then demoulding after cooling to obtain a cylinder liner blank; and
  c) successively subjecting the cylinder liner blank to external surface cleaning and molding processing to obtain the needle-shaped cylinder liner.

11. The method according to claim 10, wherein step a) comprises:
  spraying the coating solution into the inner wall of the hollow cylindrical mold in a centrifugal tube casting machine and then drying to obtain the mold with the coating attached on the surface of the inner wall thereof.

12. The method according to claim 11, wherein the coating is sprayed under a pressure of 0.3 to 0.5 MPa.

13. The method according to claim 11, wherein the centrifugal tube casting machine has a rotation speed of 1350 to 1650 r/min.

14. The method according to claim 11, wherein the hollow cylindrical mold has a temperature of 150 to 300° C.

15. The method according to claim 10, wherein the coating has a thickness of 0.3 to 1.2 mm.

16. The method according to claim 10, comprising the steps of:
A) adding the coating solution into a pressure tank of coating; activating a centrifugal tube casting machine equipped with a mold and having a rotation speed set to be 1400 to 1600 r/min and heating the mold to a temperature of 160 to 240° C.; then spraying the coating solution into an inner wall of the mold at an ejection pressure of 0.4 to 0.5 MPa; and finally drying, to obtain the mold with a coating attached on the surface of the inner wall thereof, wherein the coating has a thickness of 0.35 to 1.2 mm;
B) mixing molten iron with silicon strontium inoculant in a mass ratio of 100:(0.65-0.95) for inoculation treatment, wherein the molten iron comprises 3.31 to 3.62 wt % of C, 0.04 to 0.10 wt % of S, 2.07 to 2.68 wt % of Si, 0.07 to 0.18 wt % of P, 0.62 to 0.94 wt % of Mn, 0.27 to 0.38 wt % of Cr, 0.12 to 0.48 wt % of Cu and Fe being the balance; then controlling the inoculated molten iron at a temperature of 1480 to 1550° C. and pouring it into the rotating mold with the coating attached on the surface of the inner wall thereof, then demoulding after cooling to obtain a cylinder liner blank, wherein the cooling is carried out for 76 to 92 s and the demoulding is performed at a temperature of 680 to 800° C.; and
C) cleaning the external surface of the cylinder liner blank using a centrifugal shot-blasting machine, wherein steel shots used for cleaning have a diameter of 0.15 to 0.3 mm and an ejection pressure of 8 to 14 kg during the cleaning, and the cleaning is carried out for 8 to 16 s; then molding processing the cleaned cylinder liner blank to obtain the needle-shaped cylinder liner.

17. A needle-shaped cylinder liner produced by the method according to claim 10, wherein a plurality of protrusions are distributed on the external circumferential surface thereof, a single protrusion has a height of 0.15 to 1.2 mm, a cross-sectional area of 0.1 to 2 mm² at ⅗ of average height thereof, and a cross-sectional area of 0.05 to 7 mm² at 0.2 mm away from the root portion thereof.

18. The needle-shaped cylinder liner according to claim 17, wherein the single protrusion has a height of 0.6 to 1.1 mm.

19. The needle-shaped cylinder liner according to claim 17, wherein the single protrusion has an area of 0.2 to 0.6 mm² at ⅗ of average height thereof.

20. The needle-shaped cylinder liner according to claim 17, wherein the single protrusion has a cross-sectional area of 0.2 to 0.7 mm² at 0.2 mm away from the root portion thereof.

21. The needle-shaped cylinder liner according to claim 17, wherein the number of the protrusions on the external circumferential surface of the needle-shaped cylinder liner is not less than 30/cm².

22. The needle-shaped cylinder liner according to claim 20, wherein the number of the protrusions on the external circumferential surface of the needle-shaped cylinder liner is 40 to 65 protrusions/cm².

23. The needle-shaped cylinder liner according to claim 17, wherein the protrusions are needle-shaped, bulb-shaped, mushroom-shaped, cone-shaped or coral-shaped.

* * * * *